M. J. OWENS.
GLASS TANK.
APPLICATION FILED JUNE 11, 1909.

1,034,824.

Patented Aug. 6, 1912.

2 SHEETS—SHEET 1.

Witnesses
O. B. Belknap
James P. Barry

Inventor
Michael J. Owens
By Whittemore, Hulbert & Whittemore
Attys.

M. J. OWENS.
GLASS TANK.
APPLICATION FILED JUNE 11, 1909.
1,034,824.
Patented Aug. 6, 1912.
2 SHEETS—SHEET 2.
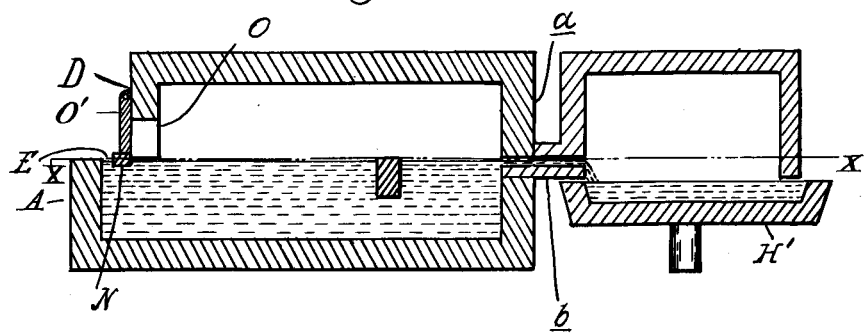
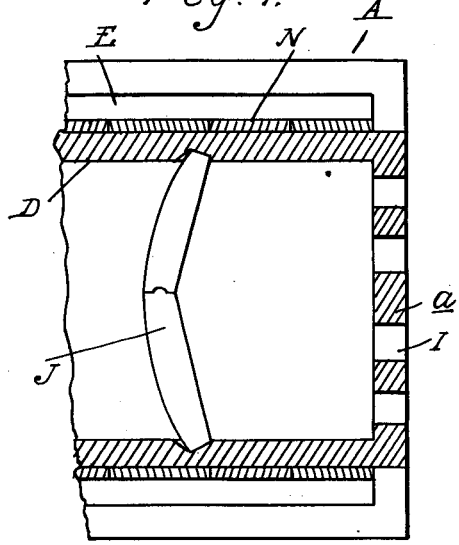

UNITED STATES PATENT OFFICE.

MICHAEL J. OWENS, OF TOLEDO, OHIO, ASSIGNOR TO THE TOLEDO GLASS COMPANY, OF TOLEDO, OHIO, A CORPORATION OF OHIO.

GLASS-TANK.

1,034,824.　　　　Specification of Letters Patent.　　Patented Aug. 6, 1912.

Application filed June 11, 1909. Serial No. 501,622.

*To all whom it may concern:*

Be it known that I, MICHAEL J. OWENS, a citizen of the United States of America, residing at the city of Toledo, county of Lucas, State of Ohio, have invented certain new and useful Improvements in Glass-Tanks, of which the following is a specification, reference being had therein to the accompanying drawings.

This invention relates to new and useful improvements in glass tanks and consists particularly in the construction of such a tank with a glass lining, at least in that portion where the batch is melted; the tank being so constructed as to admit air to such glass lining to prevent its being melted during the operation of the tank.

The invention further consists in the construction, arrangement and combination of the parts, as more fully hereinafter described and particularly pointed out in the claims.

Figure 1:
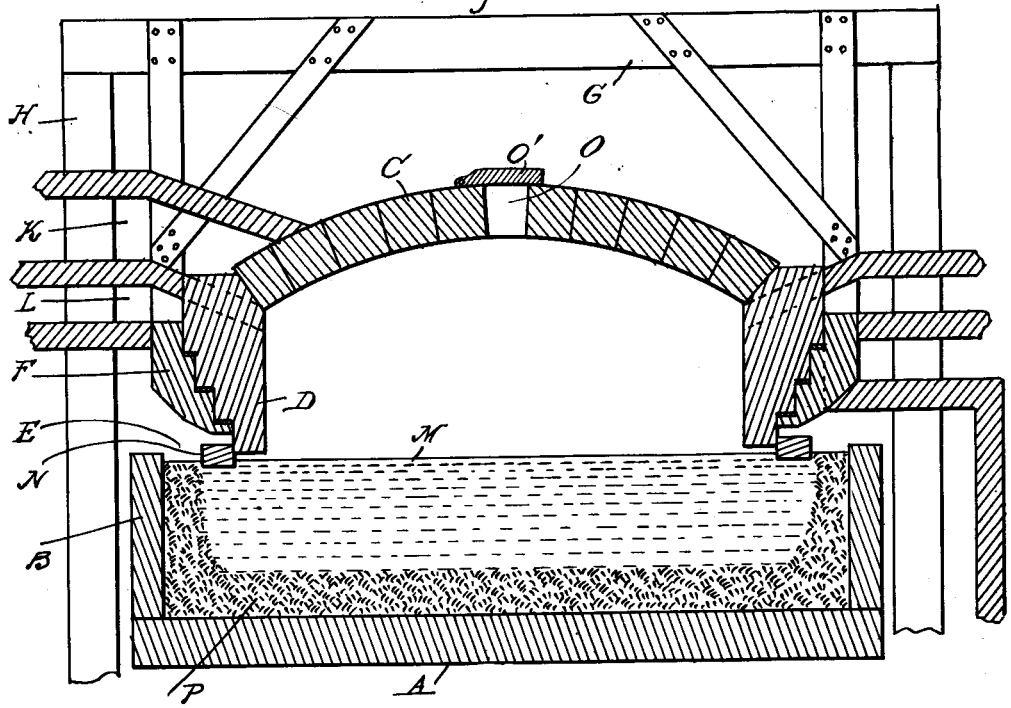
Figure 3:
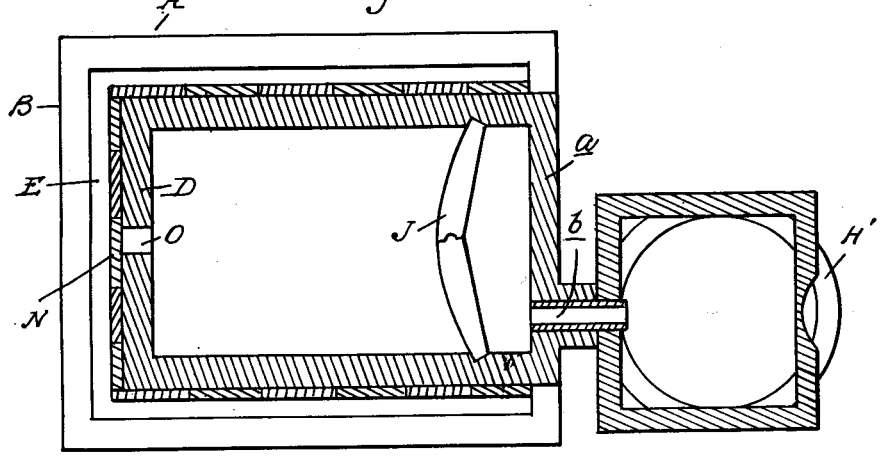

In the drawings: Figure 1 is a transverse section through a glass tank embodying my invention; Fig. 2 is a vertical longitudinal section through the body of the tank, showing it as in use in connection with a rotary tank such as is now used with automatic bottle-making machines; Fig. 3 is a horizontal section on line $x$—$x$ of Fig. 2; and Fig. 4 is a section similar to Fig. 3, showing my improved tank employed in the ordinary continuous tank in which the glass is gathered by workmen.

At the present time where continuous tanks are employed, at the end of the tank where the glass is melted, that is, where the batch is put in to be melted, the flux in the glass contacts the brick lining and eats it out so that such tanks have to be re-built and a new lining inserted very frequently, at least once a year.

With my invention, the brick lining of the furnace at all times, at least at the end where the flux would contact the bricks, is protected by a lining of glass, and this lining is kept sufficiently cool to prevent its melting; with the result that the bricks cannot be contacted by the flux and the life of the tanks is greatly prolonged.

A represents the tank—which, in this embodiment of my invention, I have shown as rectangular, with side-walls B. These side-walls extend up slightly beyond the level of the melted metal line.

C is a cap or top having depending side-portions D which, with the portions B, form the side-walls of the tank.

The depending portions D may be made of single blocks of brick or clay, molded and baked in the shape shown, and the top C may be sprung between these side-portions D. This top or cap is smaller than the tank A, so as to leave a space E laterally between the walls B and D, as clearly shown in the drawing.

The cap, with its side-portions D, may be suspended in any suitable manner, and I have shown brackets F engaging stepped bearings in the blocks D, suspended from the cross-beam G which, in turn, is suspended from suitable posts H. This suspending frame may be trussed and braced in any desirable manner, and I do not deem it necessary to go into the details of the construction of the same.

The space or air-gap E preferably extends around that portion of the tank at the melting end, or may, if desired, extend all the way around. I have shown it as extending across the one end and both sides of the tank, while the front wall $a$ at the delivery end of the tank is not provided with such an air-gap but is simply a straight wall of the ordinary construction.

Through the delivery end I have shown (Figs. 2 and 3) a discharge spout $b$ feeding into a rotary tank H. As the construction of this rotary tank is well-known, I do not deem it necessary to describe same.

In Fig. 4 I have shown the front-wall as provided with gathering-holes I. J are the usual floaters intended to prevent the scum from coming to the gathering point or being discharged into the gathering tank.

I have shown in Fig. 1 air and gas inlet passages K and L respectively, of the usual construction as ordinarily used in connection with a regenerative furnace, but as this also is well known I do not need to go into a particular description or illustration of the same.

The depending wall D is slightly above the melted metal line as indicated at M, and the wall B is slightly above the level of that metal line.

I have shown a floater N, which may be made of brick, of the usual construction, resting on the melted metal just outside of the wall D, its weight causing it to be depressed into that metal, while its upper edge projects slightly above the lower edge of the wall D, as shown in Fig. 1.

I have shown an aperture O, which in use is provided with a suitable cover O', in the top of the tank (Fig. 1) and at the end of the tank (Fig. 2). It is immaterial just how this opening is arranged, so long as it is so located and arranged that the batch may be fed in at one end of the tank, the glass being melted and flowing to the discharge—where it flows out, or is taken out, for use.

The parts being thus constructed, the operation of the device is as follows: In first starting the tank, after it is built, the batch is placed in through the feed opening in the usual manner and the gas is burned over the same for melting. In such starting operation, it probably will be necessary to cover the air-gap E with some temporary covering until the glass is melted up to the melted metal line, as shown. When this is accomplished, the temporary covering will be removed and the floats N placed in position, acting as seals to prevent the egress of the heated products of combustion from within the tank beneath the wall D and over the melted metal out through the opening E. As soon as the floats are in position, it will be observed that the outer or marginal surface of the glass of the tank will be exposed to the air in all of that portion of the opening E except that covered by the floater N. This exposure will chill the glass at the margins of the tank and cause a lining P of glass to cover the side-walls and protect those walls thereafter in the use of the tank from being contacted with the molten glass; and the result is that on the sides and ends of the tank, at the melting or feeding end thereof, there is a glass lining completely protecting the brick from contact with the flux and melting glass, so that such side-walls should have a very long lift, without material deterioration.

The only thing which could be attacked by the molten glass and flux would be the floater N, which can be easily and readily re-placed.

What I claim as my invention is:

1. A glass tank having side walls, the upper and top portion being offset inwardly from the lower portion to leave an air-gap at or about the melted metal line, and a float in the air-gap extending above the lower edge of the upper section and below the upper edge of the lower section of the side-wall, for the purpose specified.

2. A glass tank having side-walls and a top, the top approaching the level of the top of the side-walls but within the vertical plane thereof, leaving an air-gap within the side-walls and outside of the top; a float in the air-gap adjacent to the top but of lesser width than the air-gap, leaving an open section outside of the float and within the side-walls, for the purpose specified.

In testimony whereof I affix my signature in presence of two witnesses.

MICHAEL J. OWENS.

Witnesses:
MABEL O. MILLER,
T. H. MILLER.